United States Patent
Lawler et al.

(10) Patent No.: US 12,416,844 B2
(45) Date of Patent: Sep. 16, 2025

(54) CAMERA LENS HOOD PROVIDING FOR INDEPENDENT YAW, ROLL, AND PITCH ROTATIONS FOR A PLURALITY OF LENS FILTERS

(71) Applicant: Drivingplates.com LLC, Yelm, WA (US)

(72) Inventors: Michael Shawn Lawler, Yelm, WA (US); Ian Sharples, Epsom (GB)

( * ) Notice: Subject to any disclaimer, the term of this patent is extended or adjusted under 35 U.S.C. 154(b) by 0 days.

(21) Appl. No.: 18/925,920

(22) Filed: Oct. 24, 2024

(65) Prior Publication Data

US 2025/0130480 A1    Apr. 24, 2025

Related U.S. Application Data

(60) Provisional application No. 63/545,546, filed on Oct. 24, 2023.

(51) Int. Cl.
   *G03B 11/04* (2021.01)
   *G02B 7/00* (2021.01)

(52) U.S. Cl.
   CPC ............ *G03B 11/045* (2013.01); *G02B 7/006* (2013.01)

(58) Field of Classification Search
   CPC .............................. G03B 11/045; G02B 7/006
   See application file for complete search history.

(56) References Cited

U.S. PATENT DOCUMENTS

| | | | |
|---|---|---|---|
| 2005/0190461 A1* | 9/2005 | Petroff | G03B 11/045 359/819 |
| 2007/0268588 A1* | 11/2007 | Elias | G03B 11/045 359/611 |
| 2015/0116532 A1* | 4/2015 | Yang | G03B 11/00 348/222.1 |
| 2016/0234412 A1* | 8/2016 | Hiramatsu | H04N 7/15 |
| 2019/0219893 A1* | 7/2019 | Overall | G03B 11/04 |
| 2021/0382373 A1* | 12/2021 | Zeng | G03B 17/566 |

* cited by examiner

*Primary Examiner* — Clayton E. LaBalle
*Assistant Examiner* — Diana Hancock

(57) ABSTRACT

A lens hood system designed to accommodate one or more lens filters via one or more recesses. The lens filters may be inserted through various access points, including front, back, or side openings, and can be secured using methods such as threading, snap-fit tabs, or sliding mechanisms. The lens hood may be equipped with movable frame portions allowing for roll, pitch, and yaw rotations of the filters, independently or collectively, to optimize filter alignment. Additionally, the inner surfaces of the lens hood may be non-reflective or feature designs to minimize unwanted light reflections, enhancing image quality.

20 Claims, 8 Drawing Sheets

CAMERA LENS HOOD PROVIDING FOR INDEPENDENT YAW, ROLL, AND PITCH ROTATIONS FOR A PLURALITY OF LENS FILTERS

PRIORITY CLAIM

This U.S. non-provisional application claims priority to and the benefit of provisional application 63/545,546, filed Oct. 24, 2023.

SUMMARY

Lens hoods are accessories to cameras, specifically camera lenses. Lens hoods are configured to block unwanted light by physical extending outward from the camera lens. By blocking out light, lens hoods may prevent lens flares, ghosting, and other image artifacts.

Lens hoods may be made of rubber, plastic, or any other reasonable material. They may be cylindrical with an even circumferential edge or an irregular "petal-shaped" edge, such that some portions of the edge extend further from the camera lens than other portions. Generally, the longer petals are disposed on the top and bottom while the shorter petals are disposed on the sides, depending on the orientation of the camera. Lens hoods may be attached to the camera lens or otherwise fixed vis-à-vis the camera. Lens hoods may be designed for compatibility to specific camera lenses, or possess adjustable or universal attachment components to attach to a variety of camera lenses. The lens hood may be mounted to the lens via mounting threads, with the lens hood screwing onto the lens via rotation along the threads. The lens hood may feature a bayonet-style attachment that snaps onto the camera lens via groove and protrusion alignment.

The lens hood may be rotationally attached to the camera to allow for rotation of the lens hood vis-à-vis the camera.

Lens filters are tools to modify the light entering a camera lens. Filters include ultraviolet (UV) filters to reduce the blush hue that occurs when photographing in bright sunlight, circular polarizer filters which reduce glare, neutral density (ND) filters which enable photographers to use slower shutter speeds or wider apertures by reducing the light entering the lens, graduated neutral density (GND) filters for providing a gradient filter to enable capturing of details in scenes with both bright and dark areas, color filters for tinting and color correction, and infrared (IR) filters for blocking out visible light and enabling the capture of only infrared images. Lens filters may be attached to the camera lens or otherwise fixed vis-à-vis the camera.

Lens hoods and filters are similar in that they are both light control accessories, but they function differently in that lens hoods block light and filters modify light. As such, there are many instances in which it would be useful to combine them during a single shot or recording.

In one embodiment, the device comprises a lens hood with a recess configured to receive a lens filter. In another embodiment, the device comprises a lens hood with a plurality of recesses for receiving a plurality of lens filters. A cross section of the lens hood (i.e., a layer approximately parallel to the camera lens) may be square, rectangular, circular, or oval. The cross sections of the lens hood may be approximately the same throughout the lens hood, or they may taper or flare outward toward the terminal edge such that the cross section at the terminal edge is greater in circumference or perimeter than the cross section closer to the camera. In one variation, one or more side walls may extend approximately orthogonally from the plane on which the lens resides. In another variation, one or more side walls may extend non-orthogonally from the plane on which the lens resides. In yet another variation, a first set of one or more side walls may extend away from the central lens axis at a different angle than a second set of one or more side walls extend.

In one variation, the recess is accessible via a front opening of the lens hood. In this variation, the lens filter may be added to the lens hood without removing the lens hood from the camera. In another variation, the recess is accessible via a back opening of the lens hood, though this requires that the lens hood be removed from the camera in order for the lens filter to be inserted. In yet another variation, the recess is accessible via a side opening of the lens hood and therefore does not require that the lens hood be removed from the camera. In this version, the lens filter can be slidably inserted.

In one variation, the lens filter may engage threadably with the lens hood recess. In another variation, the lens filter may engage via snap-fit enclosure tabs. In yet another version, the lens filter may be held in place in a frame into which the lens filter is slidably inserted.

The lens filters and the lens hood and recess may each have a substantially circular or round cross-section, so as to mimic the shape of many round camera lenses. In one variation, the lens filters and/or lens hood recesses may be substantially square or rectangular. One problem encountered with round lens filters is the possibility of vignetting the shot/footage. The square or rectangular lens filters may prevent such vignetting and also facilitate the variation of the device in which the lens filter slides into the recess. Vignetting may also be addressed by increasing the diameter of a round lens filter, but large lens filters are more difficult to handle, and are particularly cumbersome to threadably engage with the lens hood.

In one embodiment, the lens hood recess for receiving the lens filter is disposed at an acute angle from the camera lens axis of view. Thus, if the lens itself were understood as approximately horizontal, the lens filter, as disposed in the lens hood recess, would be at an angle from the horizontal.

In one embodiment, the lens hood recess is fixed in place with respect to the main body of the lens hood. In another embodiment, the recess is configured to move rotationally with respect to the main body. The recess may be disposed within a frame or frame portion which is in turn disposed in a lens hood cavity, with the cavity providing room for the frame portion to move. The frame portion may be hingedly attached to the lens hood main body via hinges disposed at an edge thereto, or may feature a hole and pin structure, such that two holes engage with two pins, with either the holes or pins connected with the frame portion or main body. The hole and pin structure may permit the frame portion to rotate within the main body such that the pins rotate within the holes, with the rotations constituting roll or pitch rotations. Ideally, the roll or pitch rotations occur via the hole and pin structure along the axis defined by two of the pins, with the axis of rotation passing through approximately the center of the frame portion. The lens filter may also rotate in a yaw rotation within the frame portion around the camera axis of view.

In one embodiment, since the frame portion, during roll or pitch rotation, would result in the edges of the frame portion at 90 degrees from the pin and hole structure being further away from the inner wall of the lens hood cavity, the lens hood cavity, frame portion, and lens filter may be sufficiently great in diameter or width/length such that the lens, even after rotation, still encompasses the camera lens field of view.

In one embodiment, the lens filter, and frame portion features a width longer than a length of the same, so as to account for the distortion vis-à-vis the lens field of view which occurs after rotation.

In one embodiment, the frame portion consists of an outer frame portion and an inner frame portion, with the outer frame portion configured to engage in roll or pitch rotations with respect to the main body and the inner frame portion configured to engage in yaw rotations with respect to the outer frame portion. Yaw rotations in this instance are enabled via a track relationship between the outer and inner frame portions.

In the embodiment in which there are a plurality of recesses for receiving a plurality of lens filters, the plurality of recesses may all be disposed within a common frame portion, such that roll or pitch rotations via the frame portion affect each of the plurality of lens filters simultaneously. Alternatively, each lens filter may have a dedicated frame portion, thereby enabling independent roll or pitch rotations for each lens filters.

In one embodiment, a lens hood comprises a plurality of frame portions for a plurality of lens filters, and each frame portion consists of an inner frame portion and an outer frame portion, allowing complete independence of yaw, roll, and pitch rotations for each lens filter.

In one variation, the petals of the lens hood are connected hingedly to the main body of the lens hood, allowing for the angle of the petals to be adjusted with respect to the camera lens axis of view. In another variation, the petals of the lens hood are fixed in place so that they are fixedly parallel to the camera lens axis of view, or alternatively fixedly at an acute angle therefrom.

The lens hood wall(s) have outer face(s), which are exposed to the atmosphere, and inner face(s), which are on an opposite face of the lens hood from the outer face(s) and which "look" inward toward the axis passing orthogonally through the lens hood and ultimately, the camera lens. In one embodiment, the inner faces of the lens hood are non-reflective. The non-reflectivity may be achieved through choice of material, non-reflective or matte paint, an attachment or fitting, or any other suitable means. The non-reflective paint may be a textured paint that scrambles light rays rather than provide a smooth surface for cohesive reflection. The fitting may be a semi-porous material, such as foam, thereby trapping light within niches. Attachments or fittings may be attached mechanically, via a snug-fit relationship with the lens hood, via snap-fit type coupling, or via an adhesive.

In another embodiment, the inner faces of the lens hood feature a curvature design to reflect light away from the lens. This curvature may comprise concave niches, grooves, ridges, or any other non-smooth surface contour.

In one variation, instead of a lens filter, the lens hood holds a mere piece of glass.

DETAILED DESCRIPTION OF THE DRAWINGS

Figure 1A:
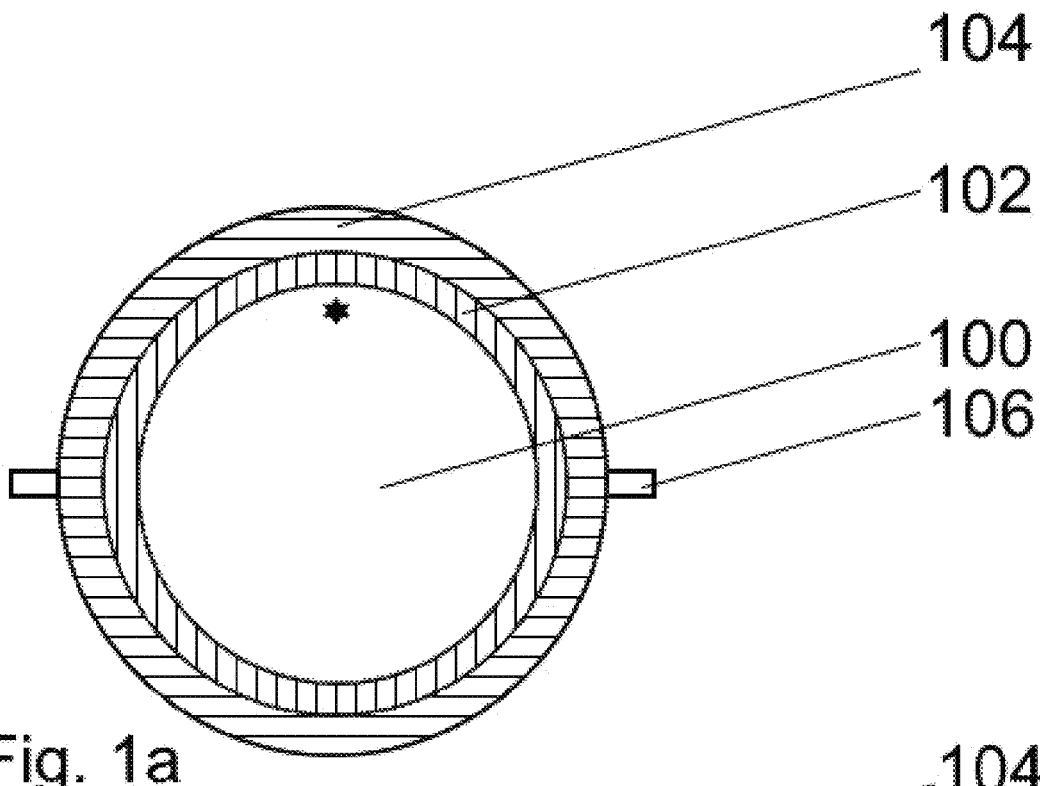
FIGS. 1a and 1b show the frame portion divided into two parts to enable the lens filter to rotate in two dimensions.
Figure 1B:
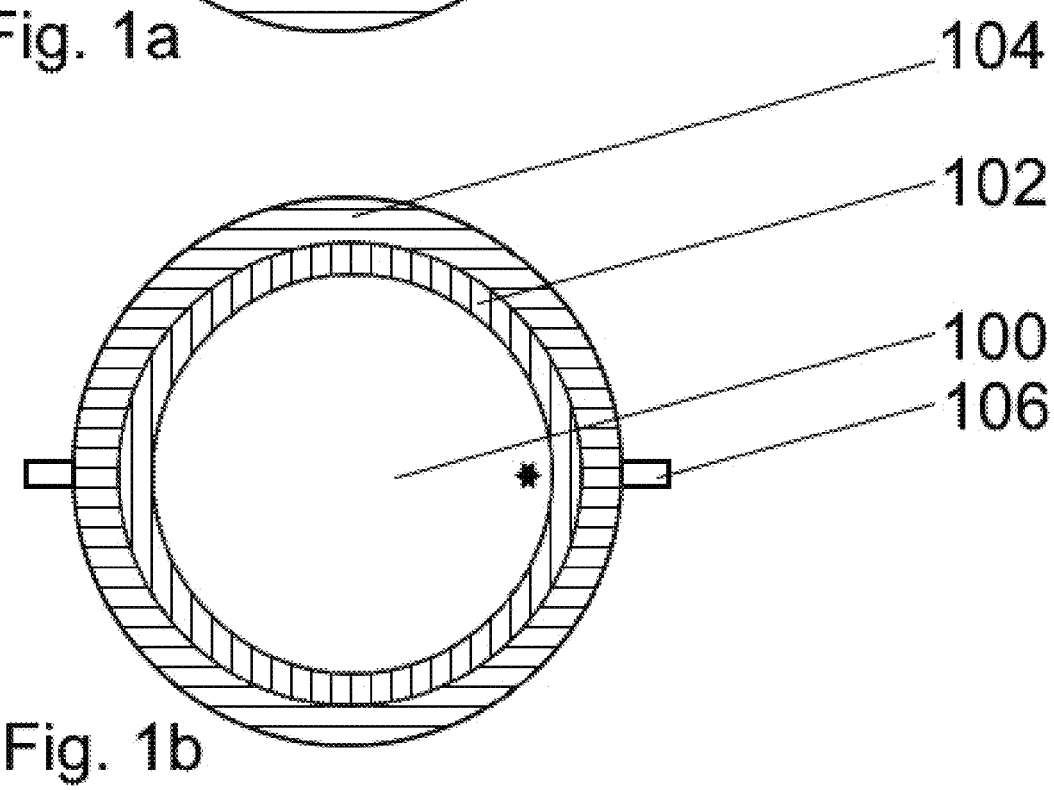

FIGS. 1a-1b show that the device may include a lens filter 100, an inner frame portion 102, an outer frame portion 104, and a set of pins 106. The lens filter may be disposed in the inner frame portion, which in turn is rotatably engaged with the outer frame portion via a track, with the track disposed between the inner and outer frame portions. As seen in the transformation from FIG. 1a-1b, the lens filter in the inner frame portion may be rotated with respect to the outer frame portion. This rotational transformation is demonstrated via the ninety degree rotation of the star about the central point. The pins 106 are configured to engage with holes in the lens hood to allow for roll or pitch rotations of the entire frame portion vis-à-vis the lens hood.

Figures 2A, 2B:
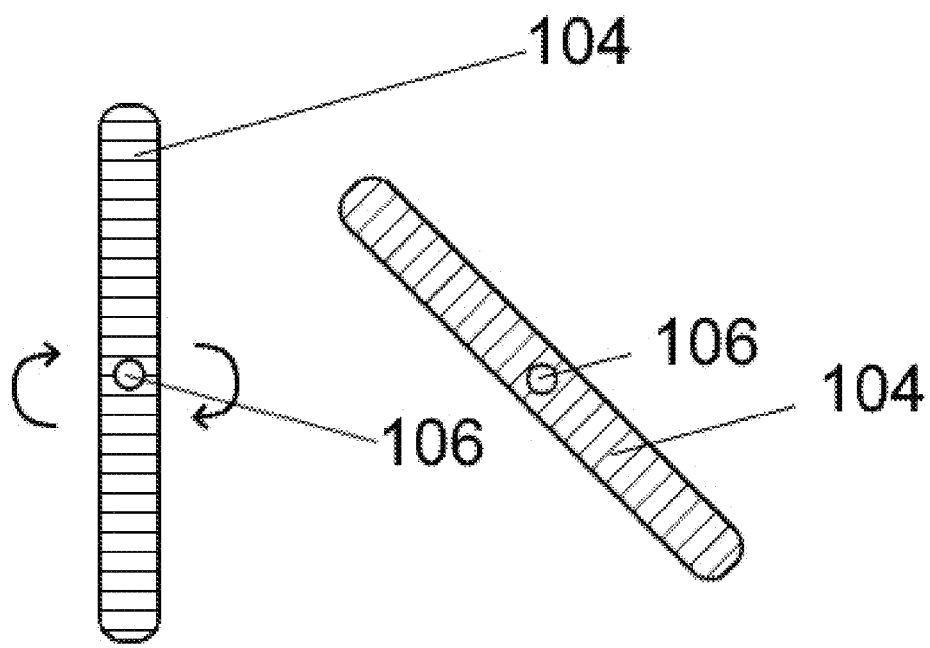
FIGS. 2a and 2b show the frame portion with a pin and hole structure to enable rotation.

FIGS. 2a-2b show the roll or pitch rotation of the frame portion with the pins providing the axis of rotation.

Figures 3A, 3B:
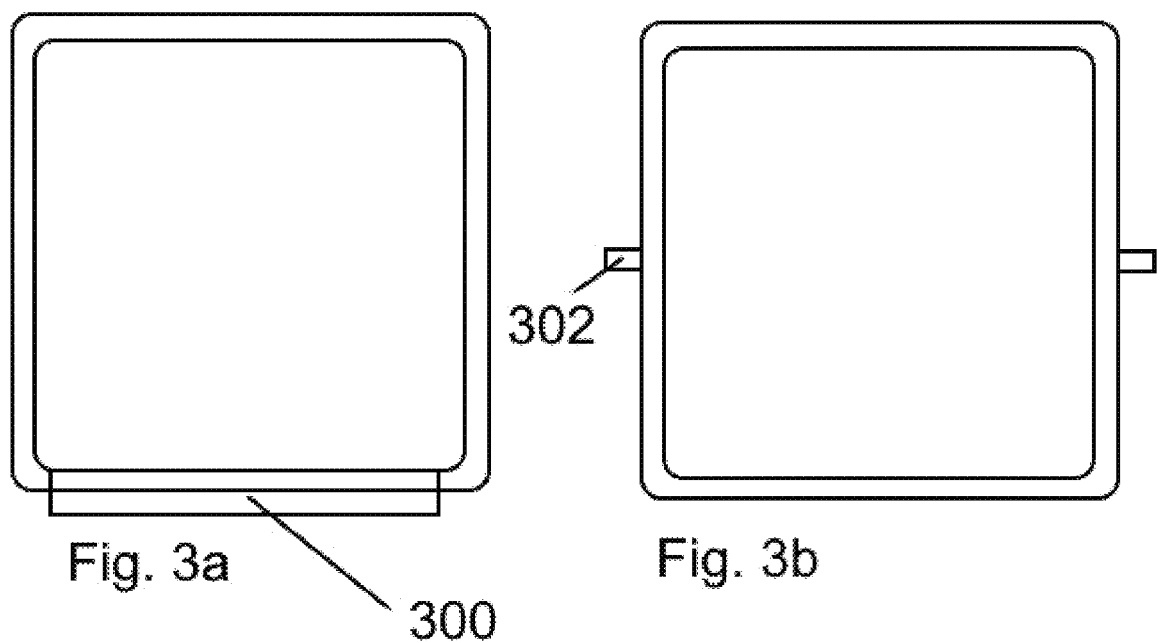
FIGS. 3a and 3b show the frame portion with a hinged structure to enable rotation.

FIGS. 3a-3b show square lens filters. In addition, FIG. 3a shows the lens filter attached hingedly to the lens hood, thus the axis of rotation is situated at the hinges 300. FIG. 3b shows a square lens filter with the axis of rotation situation at the pins 302.

Figure 4A:
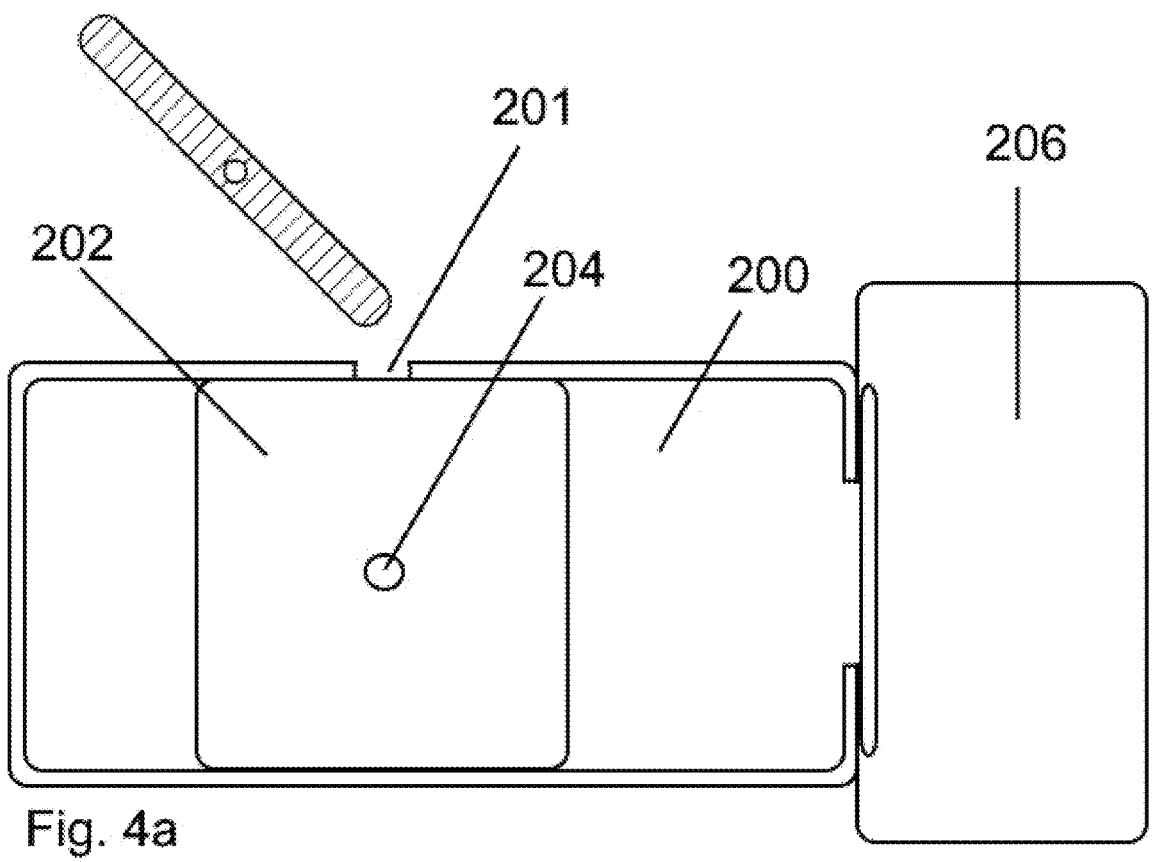
FIGS. 4a-4b show a frame portion (and lens filters) being insertable into a side opening of the lens hood.
Figure 4B:
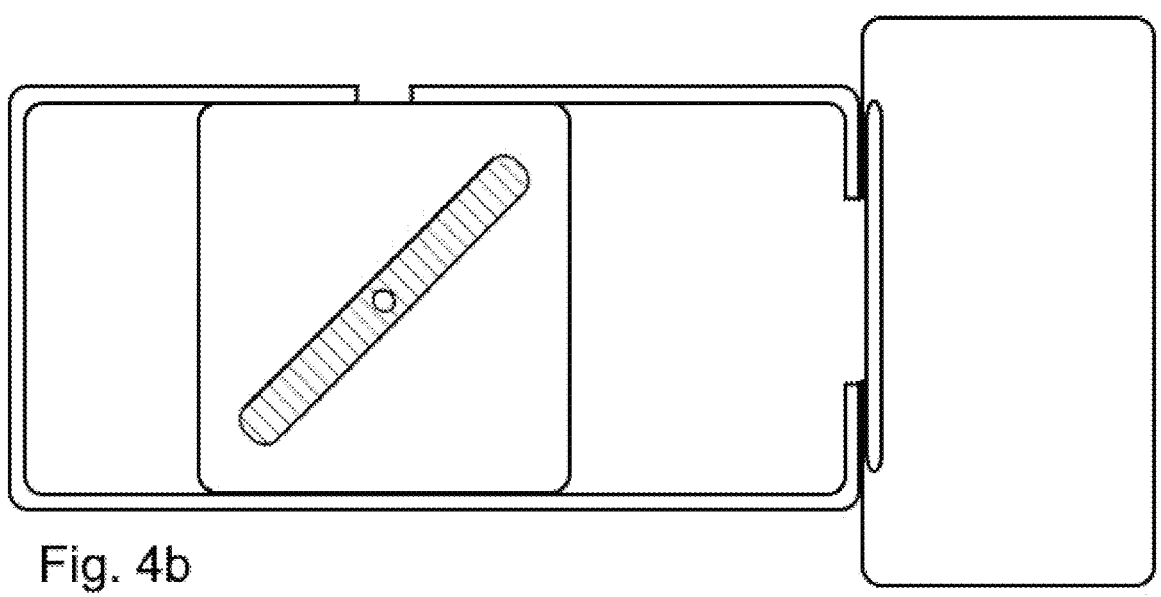

FIGS. 4a-4b show the lens filter and frame portion configured to be inserted into the recess 201 of the lens hood 200. The pins are configured to engage with the holes 204 of the lens hood, allowing the lens filter to rotate within the cavity 202. The lens hood is shown attached to the camera 206. The lens hood, as an attachment, may attached to a permanent or previously existing lens hood, such as one permanently or previously attached to the camera. The attachment lens hood may attach such that inner face of one lens hood attaches to the outer face of the other lens hood (i.e., male-female or female-male).

Figure 5:
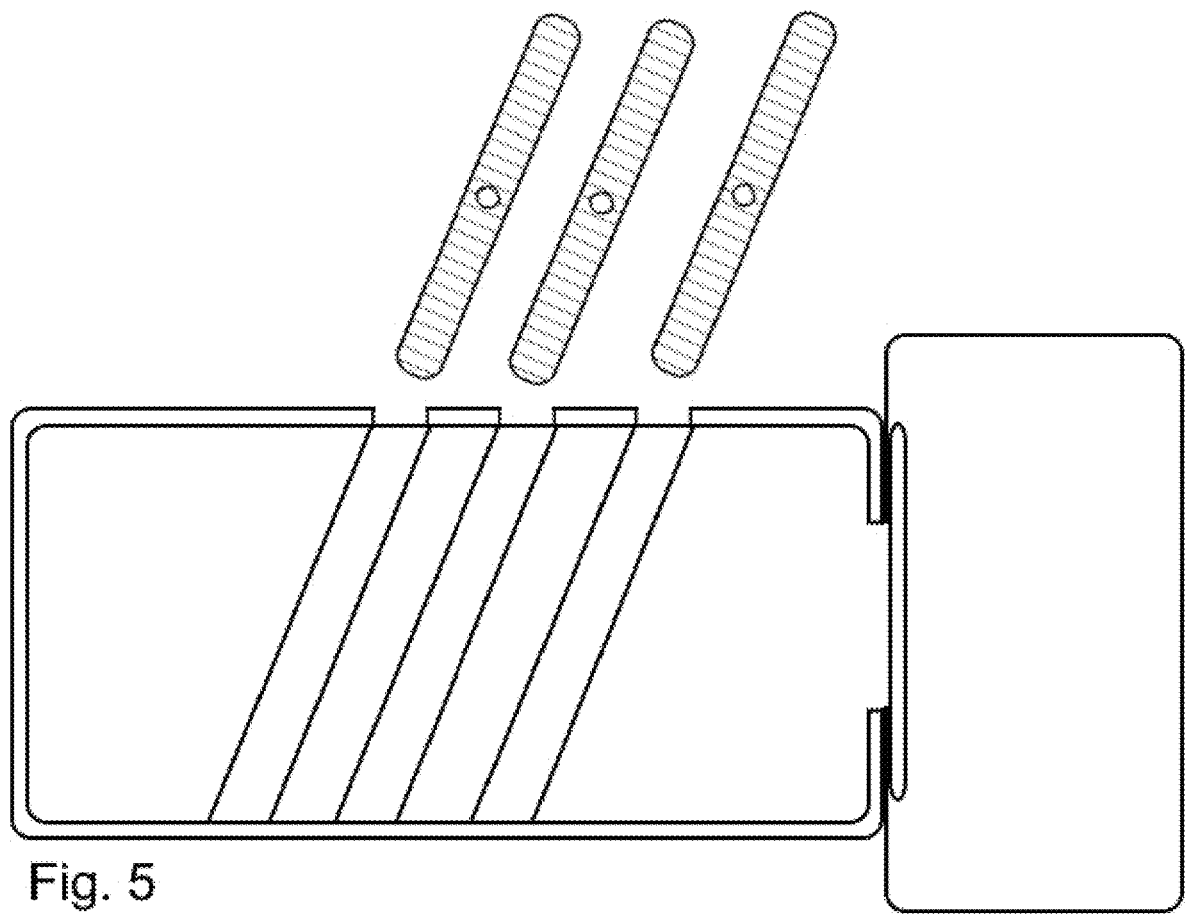
FIG. 5 shows a plurality of frame portions (and lens filters) being insertable into a side opening of the lens hood.

FIG. 5 shows a plurality of recesses for receiving a plurality of lens filters. The recesses and lens filters may be of any thickness (e.g., 2, 3, 4 mm, etc.). The recesses may be inserted from, vis-à-vis the camera, a top side of the lens hood, a bottom side of the lens hood, a left side of the lens hood, or a right side of the lens hood.

FIGS. 6-9 show various view of the lens hood, including the inner opening 500 which is configured to mount to a camera, the outer opening 502 which guides and filters the visual matter, the set of side walls 504 that define the inner opening and outer opening by the terminal edges, the near portion 505 of the set of side walls 506, the far portion 508 of the set of side walls, the middle portion 511 of the set of side walls, and the frame 510 which contains the recess 604 for holding the lens filter. The near portion is closer to the camera than the far portion, and the middle portion is disposed between the near and far portions. The lens recess shown here is accessible via a side opening-specifically, the lens filter may be slided into the side opening in a manner substantially perpendicular to the main axis that passes through the lens hood. The frame may in one embodiment be disposed in the far portion and the recess may be considered to be disposed between the frame and the middle portion. Alternatively, the lens recess may be considered to be disposed within the frame itself, and therefore both the frame and the recess may be considered to be disposed within the far portion. The frame may be considered to include a single lip which holds forms the recess against the middle portion, or a lip and a brim, with the brim being continuous with the middle portion and the recess formed by the gap between the lip and the brim.

The set of side walls include an outer face 600 and an inner face 602, with the outer face being exposed to the atmosphere and the inner face being (to a degree) shielded from the atmosphere by the set of side walls. The set of side walls include a top-side wall 606, a left-side wall 608, a right-side wall 610, and a bottom-side wall 612.

Figure 6:
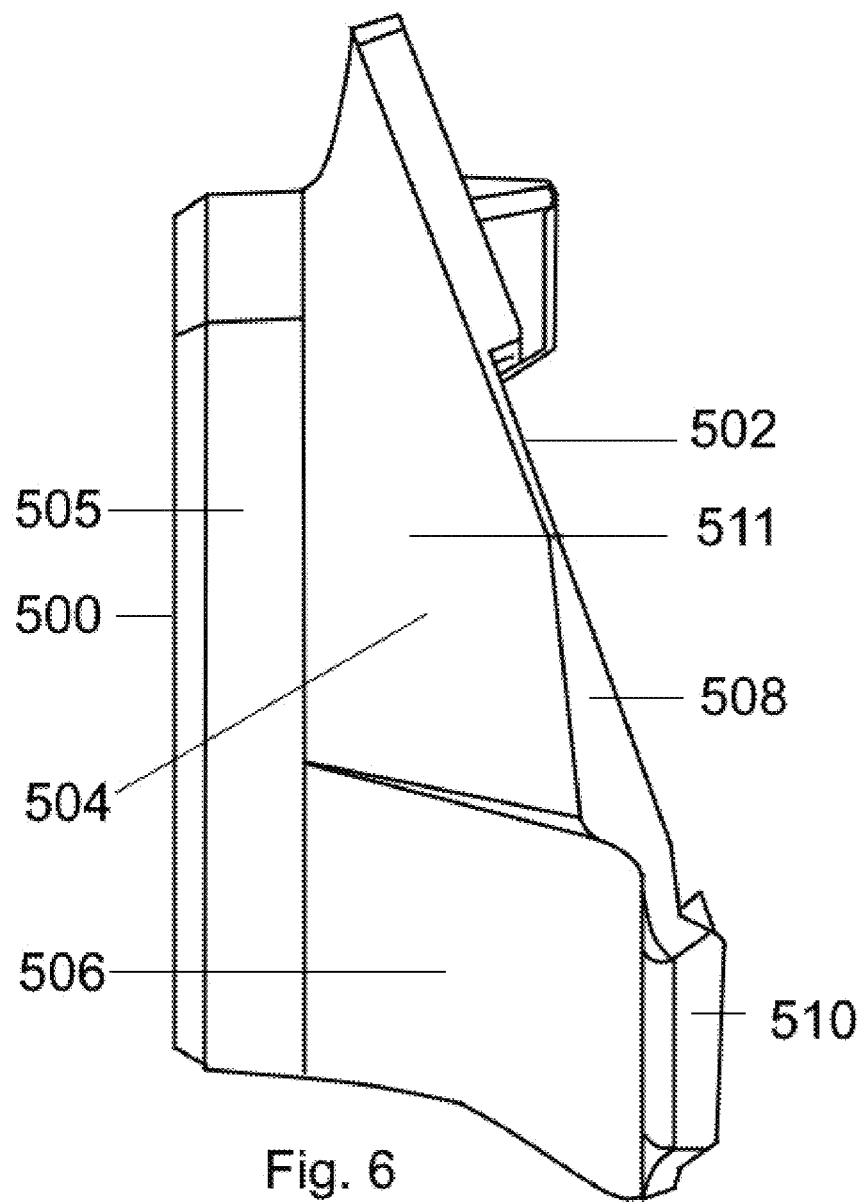
FIGS. 6-9 show a variety of views of an embodiment of the lens hood.
Figure 7:
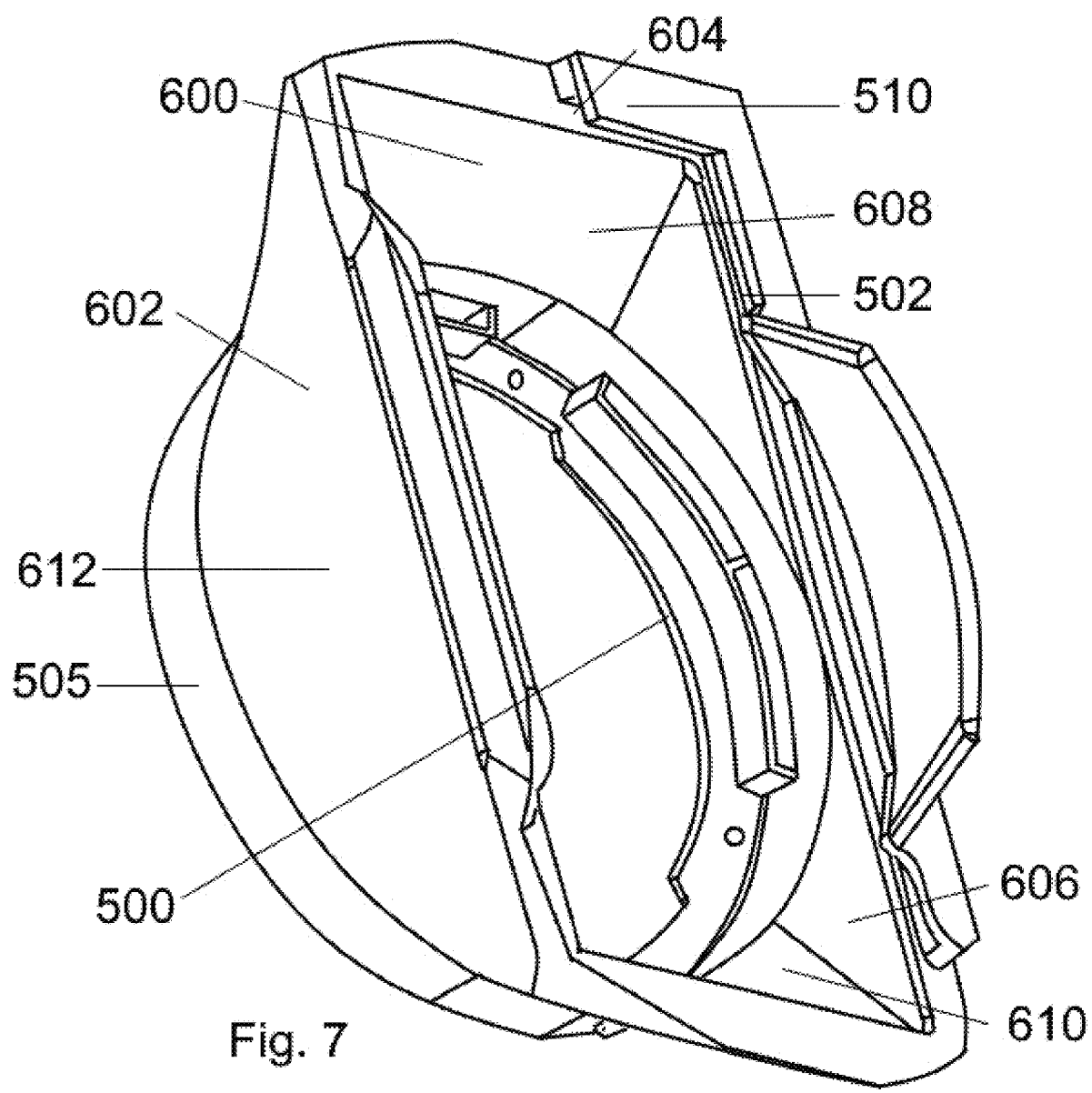
Figure 8:
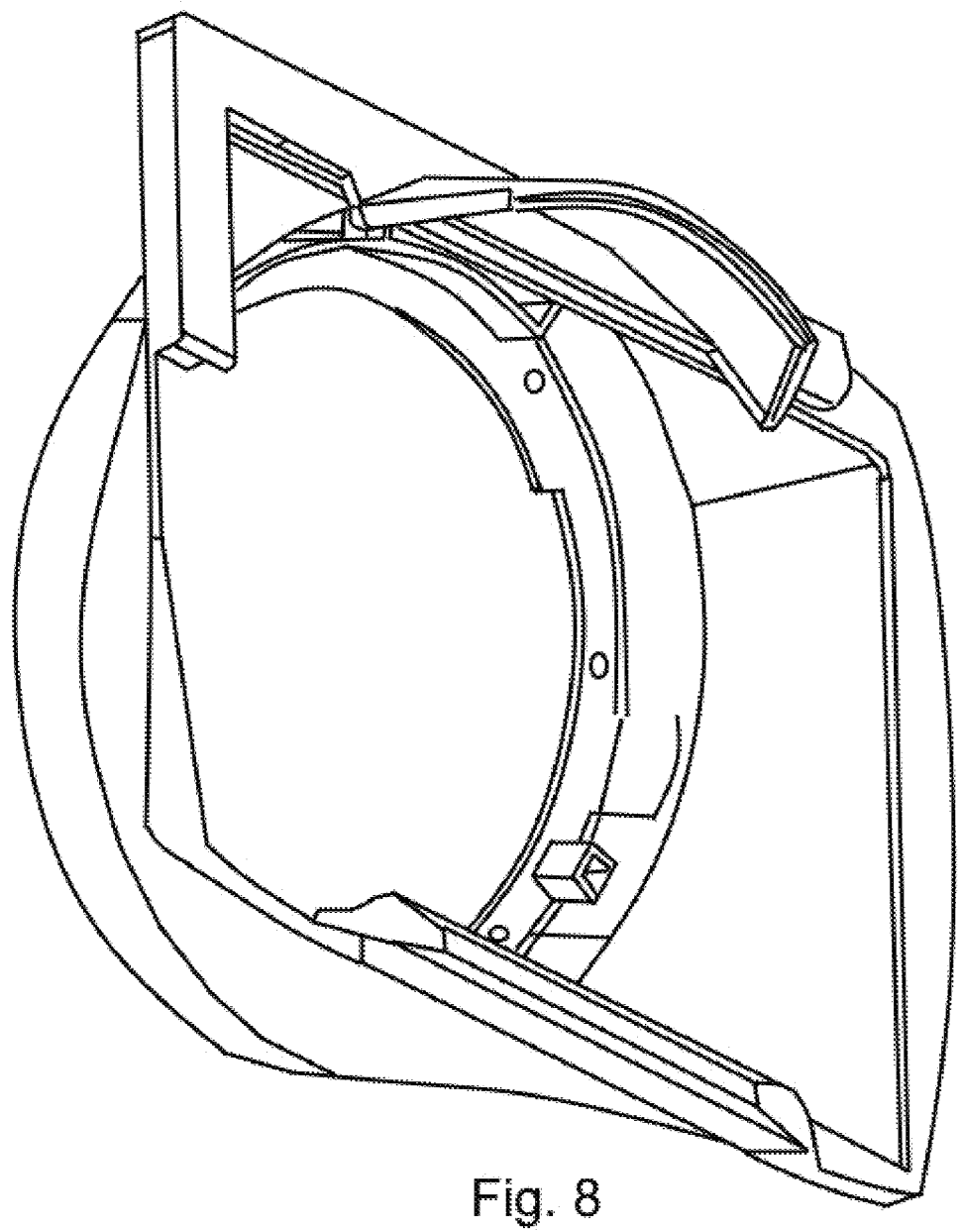
Figure 9:
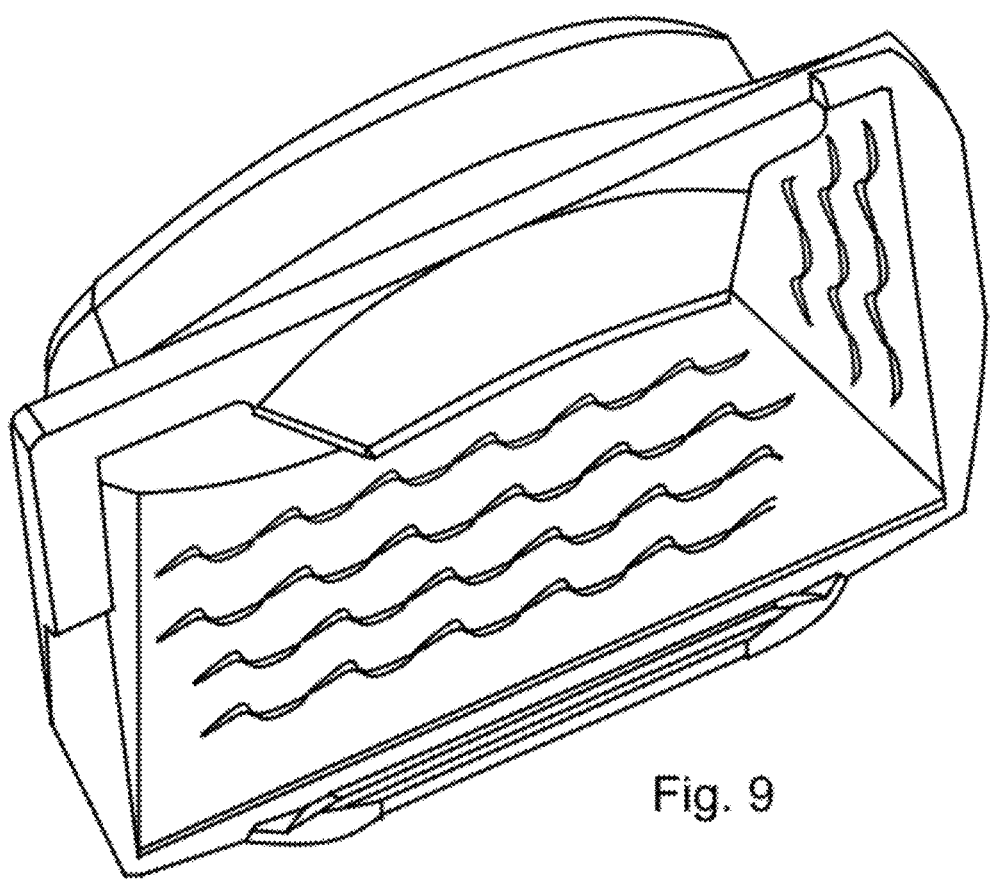

As shown clearly in FIGS. 6 and 8, a cross-section of the near portion (i.e., the edge defining the inner opening) would be substantially parallel to the camera lens. The cross-section of far portion (i.e., the edge defining the outer opening) would be at an angle from the camera lens. This angle is provided by the length of the bottom-side side wall, which extends beyond the top-side wall and flares outward away from a conceptual axis passing through the middle of the lens hood.

The invention claimed is:

1. A lens hood for a camera comprising a set of side walls and a lens recess,
   a. with the set of side walls comprising a top-side wall, a left-side wall, a right-side wall, and a bottom-side wall;
      i. with the top-side wall, left-side wall, right-side wall, and bottom-side wall each having a near portion, a middle portion, a far portion, an outer face, and an inner face;
      ii. with the near portion being closer to the camera than the far portion and the middle portion being disposed between the near and far portions;
      iii. with the far portions of the set of side walls forming an outer opening and the near portions of the set of side walls forming an inner opening, with the inner opening configured to engage with the camera;
      iv. with a near portion cross-sectional area being defined by the near portions of the set of side walls;
      v. with a far portion cross-sectional area being defined by the far portions of the set of side walls;
      vi. with a middle portion cross-sectional area being defined by the middle portions of the set of side walls;
      vii. with the far portion of the bottom-side wall flaring outwards from the near portion of the bottom-side wall;
      viii. with the inner faces configured to scramble light rays and prevent reflections by:
         1. comprising or being coated by a non-reflective material, a non-reflective paint, a textured paint, or a semi-porous material, or comprising a series of grooves, niches, or ridges;
   b. with the lens recess occupying the middle portion cross-sectional area and configured to receive a lens filter;
   c. with the middle portion cross-sectional area being disposed on a plane at an acute angle to the near portion cross-sectional area.

2. The lens hood in claim 1, with the lens recess having a first lens recess sub-division and a second lens recess sub-division, with the first and second lens recess sub-divisions each being configured to receive respectively a first and second lens filter.

3. The lens hood in claim 1, with the set of side walls extending substantially in parallel from the near portion to the far portion.

4. The lens hood in claim 1, with the far portion cross-sectional area being substantially rectangular.

5. The lens hood in claim 1, with the far portion cross-sectional area being substantially trapezoidal.

6. The lens hood in claim 1, with the far portions of the left-side wall and the right-side wall flaring outwards from the near portions of the left-side wall and the right-side wall.

7. The lens hood in claim 1, with the lens recess configured to receive substantially rectangular lens filters.

8. The lens hood in claim 1, with the lens recess being accessible via the outer opening and where receipt of the lens filter by the lens recess may be achieved through passing the lens filter through the outer opening and into the lens recess.

9. The lens hood in claim 1, with the lens hood having a side opening, with the recess being accessible via a side opening, and where receipt of the lens filter by the lens recess may be achieved through sliding the lens filter through the side opening and into the lens recess.

10. A lens hood for a camera comprising a set of side walls a frame portion, and a lens recess,
    a. with the set of side walls comprising a top-side wall, a left-side wall, a right-side wall, and a bottom-side wall;
       i. with the top-side wall, left-side wall, right-side wall, and bottom-side wall each having a near portion, a middle portion, a far portion, an outer face, and an inner face;
       ii. with the near portion being closer to the camera than the far portion and the middle portion being disposed between the near and far portions;
       iii. with the far portions of the set of side walls forming an outer opening and the near portions of the set of side walls forming an inner opening, with the inner opening configured to engage with the camera;
       iv. with a near portion cross-sectional area being defined by the near portions of the set of side walls;
       v. with a far portion cross-sectional area being defined by the far portions of the set of side walls;
       vi. with a middle portion cross-sectional area being defined by the middle portions of the set of side walls;
       vii. with the far portion cross-sectional area being greater than the near portion cross-sectional;
       viii. with the inner faces configured to scramble light rays and prevent reflections by:
          1. comprising or being coated by a non-reflective material, a non-reflective paint, a textured paint, or a semi-porous material, or comprising a series of grooves, niches, or ridges;
    b. with the lens recess being disposed within the frame portion and with the lens configured to receive a lens filter.

11. The lens hood in claim 10, with the frame portion occupying the middle portion cross-sectional area.

12. The lens hood in claim 10, with the frame portion occupying the far portion cross-sectional area.

13. The lens hood in claim 10, with the frame portion having a hinged attachment to a middle portion of a given side wall, with the hinged attachment configured to enable a lens filter, when received by the lens recess, to rotate hingedly with respect to the middle portion of the given side wall.

14. The lens hood in claim 10, with the frame portion having a whole and pin engagement with middle portions of two given side walls, with the whole and pin engagement configured to enable a lens filter, when received by the lens recess, to rotate with respect to the middle portions of the two given side walls.

15. The lens hood in claim 10, with the far portion cross-sectional area defined being substantially circular.

16. The lens hood in claim 10, with the lens recess configured to receive substantially circular lens filters.

17. A lens hood for a camera comprising a set of side walls a frame portion, and a lens recess,
   a. with the set of side walls comprising a top-side wall, a left-side wall, a right-side wall, and a bottom-side wall;
      i. with the top-side wall, left-side wall, right-side wall, and bottom-side wall each having a near portion, a middle portion, a far portion, an outer face, and an inner face;
      ii. with the near portion being closer to the camera than the far portion and the middle portion being disposed between the near and far portions;
      iii. with the far portions of the set of side walls forming an outer opening and the near portions of the set of side walls forming an inner opening, with the inner opening configured to engage with the camera;
      iv. with a near portion cross-sectional area being defined by the near portions of the set of side walls;
      v. with a far portion cross-sectional area being defined by the far portions of the set of side walls;
      vi. with a middle portion cross-sectional area being defined by the middle portions of the set of side walls;
      vii. with the far portion cross-sectional area being greater than the near portion cross-sectional;
      viii. with the far portions of the bottom-side wall flaring outwards from the near portion of the bottom-side wall;
      ix. with the far portion of the bottom-side wall being further from the near portion of the bottom-side wall than the far portion of the top-side wall is from the near portion of the top-side wall;
      x. with the inner faces configured to scramble light rays and prevent reflections by:
         1. comprising or being coated by a non-reflective material, a non-reflective paint, a textured paint, or a semi-porous material, or comprising a series of grooves, niches, or ridges;
   b. with the far portion cross-sectional area being at an angle from the near portion cross-sectional area;
   c. with the frame portion occupying the far portion cross-sectional area, with the lens recess being disposed within the frame portion and with the lens configured to receive a lens filter.

18. The lens hood in claim 17, with the far portion cross-sectional area being substantially rectangular and the near portion cross-sectional area being substantially circular.

19. The lens hood in claim 17, with the far portion cross-sectional area and the near portion cross-sectional area each being substantially rectangular.

20. The lens hood in claim 17, with the far portion cross-sectional area and the near portion cross-sectional area each being substantially circular.

* * * * *